United States Patent [19]

Takahashi

[11] Patent Number: 5,064,065
[45] Date of Patent: Nov. 12, 1991

[54] CASE FOR ACCOMMODATING A MAGNETIC TAPE CASSETTE

[75] Inventor: Daisuke Takahashi, Kanagawa, Japan

[73] Assignee: Fuji Photo Film Co., Ltd., Kanagawa, Japan

[21] Appl. No.: 584,025

[22] Filed: Sep. 18, 1990

[30] Foreign Application Priority Data

Sep. 20, 1989 [JP] Japan .............................. 1-109164[U]
Aug. 21, 1990 [JP] Japan .............................. 2-86739[U]

[51] Int. Cl.⁵ ............................................ B65D 85/672
[52] U.S. Cl. ...................................... 206/387; 206/493
[58] Field of Search ....................... 206/387, 408, 493

[56] References Cited

U.S. PATENT DOCUMENTS

| | | | |
|---|---|---|---|
| 4,230,225 | 10/1980 | Okada et al. | 206/387 |
| 4,235,334 | 11/1980 | Ahn | 206/387 |
| 4,291,801 | 9/1981 | Basili | 206/387 |
| 4,428,482 | 1/1984 | Ogawa | 206/387 |
| 4,614,269 | 9/1986 | Dietze | 206/387 |
| 4,743,077 | 5/1988 | Bohnet et al. | 206/387 |
| 4,757,896 | 7/1988 | Huko | 206/387 |
| 4,856,653 | 8/1989 | Ackeret | 206/387 |
| 4,913,287 | 4/1990 | Kagano | 206/387 |
| 4,928,825 | 5/1990 | Hehn | 206/387 |

Primary Examiner—Jimmy G. Foster
Attorney, Agent, or Firm—Sughrue, Mion, Zinn, Macpeak & Seas

[57] ABSTRACT

A case arranged such that a cover having a pocket and a casing portion having stoppers are pivotally secured to each other in the manner of a door, in which the stopper is formed such that a portion coming into contact with spokes of the cassette has a bent or curved portion extending substantially along the direction of winding and tightening the hub. The curved or bent portion is provided with an inclined upper end surface for decreasing the projecting height in the direction of its projecting end. Accordingly, when the cover is closed with respect to the casing portion after the magnetic tape cassette is placed in the pocket, the spoke is engaged with the inclined upper end surface of the stopper, so that the spoke is guided along the inclined upper end surface in the direction of winding and tightening the magnetic tape, thereby allowing the hub to rotate and effecting the winding and tightening of the tape. After the tape is wound and tightened, the spoke is finally retained at the terminating end or in the vicinity of the terminating end of the curved or bent portion. Hence, shaking movement of the hub in the loosening direction is prevented, thereby preventing tape slackening when the cassette is stored in the case.

15 Claims, 5 Drawing Sheets

CASE FOR ACCOMMODATING A MAGNETIC TAPE CASSETTE

BACKGROUND OF THE INVENTION

The present invention relates to a case for accommodating a magnetic tape cassette, and more particularly to a case for accommodating a magnetic tape cassette suitable for storing a magnetic tape cassette of a type intended for audio use.

A magnetic tape cassette per se has a front opening into which a magnetic head or the like is inserted when the cassette is loaded in a magnetic recording and reproducing apparatus, the cassette being arranged such that a magnetic tape wound around a pair of reel hubs travels across the front opening portions.

Due to this construction, dust or the like is liable to enter the cassette through the front opening portions. Also, there is the possibility of tape slackening or the like occurring in the magnetic tape wound on the hubs due to the rotation of same. Accordingly, for the purposes of preventing the cassette from occurring these problems and protecting the cassette per se, the cassette is often stored in an appropriate case, as will be described below.

FIGS. 10 and 11 show the basic structure of a conventional case. Specifically, the case 31 has a cover 32 having a pocket 34 for receiving a cassette 20, as well as a casing portion 36 having a pair of a cross-shaped stopper 37 adapted to enter a pair of shaft insertion holes 22 of the cassette 20. A pivot 38 respectively provided projectingly on left and right inner side walls of the casing portion 35 are rotatably fitted with holes provided in left and right side walls of the pocket 34 so that the casing portion 35 can be closed with the cover 32 like a door.

In a case where the aforementioned cassette 20 is accommodated in the case 31, the thick portion 21 of the cassette 20 is inserted into the pocket 34, and the cover 32 and the casing portion 35 are then closed. At this time, when the stoppers 37 enter the shaft insertion holes 22, an elongated member 37a of each stopper 37 engages any one of six spokes 23, as shown in FIG. 11.

Since the aforementioned spokes 23 are formed integrally with a pair of hubs 24 around which the magnetic tape is wound, large amounts of rotation of the hubs 24 can be prevented by retaining the spokes 23 by means of the elongated member 37a.

However, the width $W_1$ of a wall portion of the elongated member 37a for retaining the spokes 23 is much smaller than the gap $W_0$ between each spokes 23, so that a gap $2W_2$ which is determined by $W_0 - W_1$ is created. For this reason, there are cases where the magnetic tape can unwind to an undesirable degree due to a shaking movement permitted by the gap $W_2$, despite the fact that the spoke 23 is retained by the elongated member 37a. Hence, there have been cases where tape slackening occurs in the tape located in the front opening portion of the cassette.

It should also be noted that if the width $W_1$ of the wall portion of the elongated member is enlarged, although the amount of shaking movement of the hub 24 becomes smaller, there arises another drawback in that it becomes difficult for the stopper 37 to enter gap $W_0$ between each spokes 23. In general, the less the harmful engagement of the spokes 23 with the elongated member 37a, the easier it is to close the case 31. For such reasons, the above shaking movement of the hub 24 in the unwinding direction of the tape is unavoidable to a certain extent.

Accordingly, it may occur that the tape in the magnetic tape cassette 20 accommodated in the case 32 is slackened to some degree. If the amount of tape slackening increases, the magnetic tape may be stuck on the surface of the tape guide during recording or reproduction. This can cause damage to the tape and, in an extreme case, result in tape jamming, thereby making tape movement impossible. To prevent this from happening, often the user will correct the tape slackening by rotating the aforementioned hub manually with his fingers as stick-shaped member before the magnetic tape is loaded in the recording and reproducing apparatus.

SUMMARY OF THE INVENTION

The present invention has been made to overcome the afore-described problems, and an object of the present invention is to provide a case for accommodating a magnetic tape cassette in which the case has a pair of stoppers arranged so that the hubs rotate in the tape-winding direction respectively, simply by accommodating the magnetic tape cassette into the case.

The aforementioned and other objects of the present invention have been achieved by a means of case in which a cover having a pocket for accommodating one end of a magnetic tape cassette and a casing portion having a pair of cross-shaped stoppers for preventing the rotation of a pair of hubs by engaging with a plurality of spokes of the pair of hubs are rotatably pivoted to each other openably in the manner of a door, wherein the cross-shaped stoppers have at least a portion thereof located between adjacent ones of the spokes and having at least one bent or curved portion extending substantially along an inner peripheral edge of the hub. The bent or curved portion is provided with an inclined upper end surface for rotating and urging the hub in the direction of winding and tightening the tape by coming into contact with the spoke when the casing portion and the cover are closed with respect to each other.

DESCRIPTION OF THE PREFERRED EMBODIMENTS

Hereinafter, a detailed description will be given of the preferred embodiments of a case to which the present invention is applied.

Figure 1:
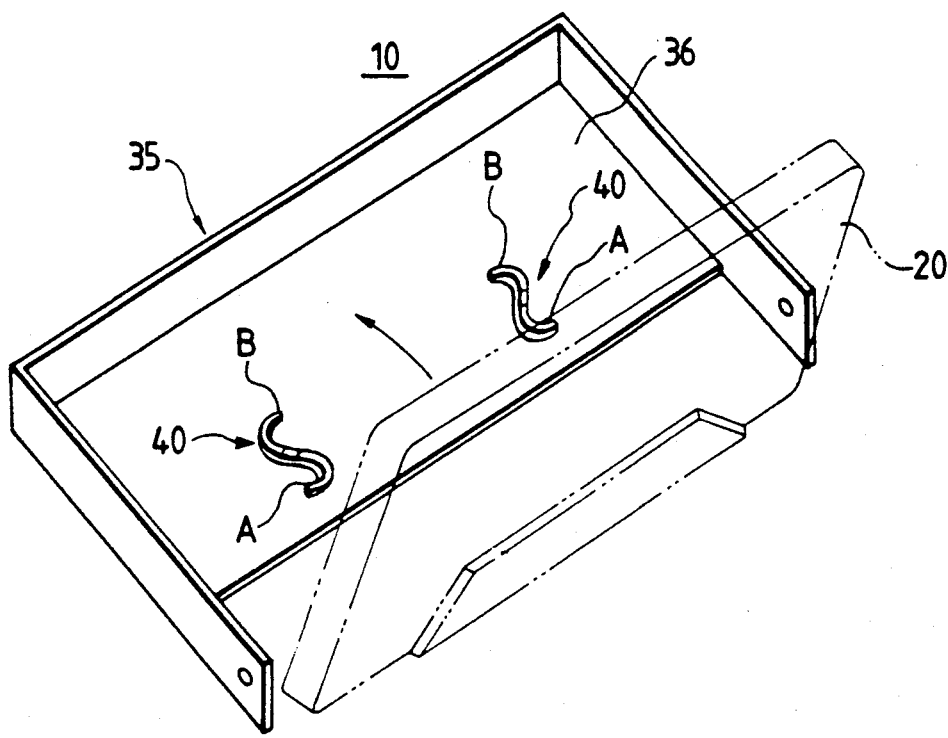
FIG. 1 is a perspective view of essential portions of the preferred embodiment of the case according to the present invention.
Figure 2:
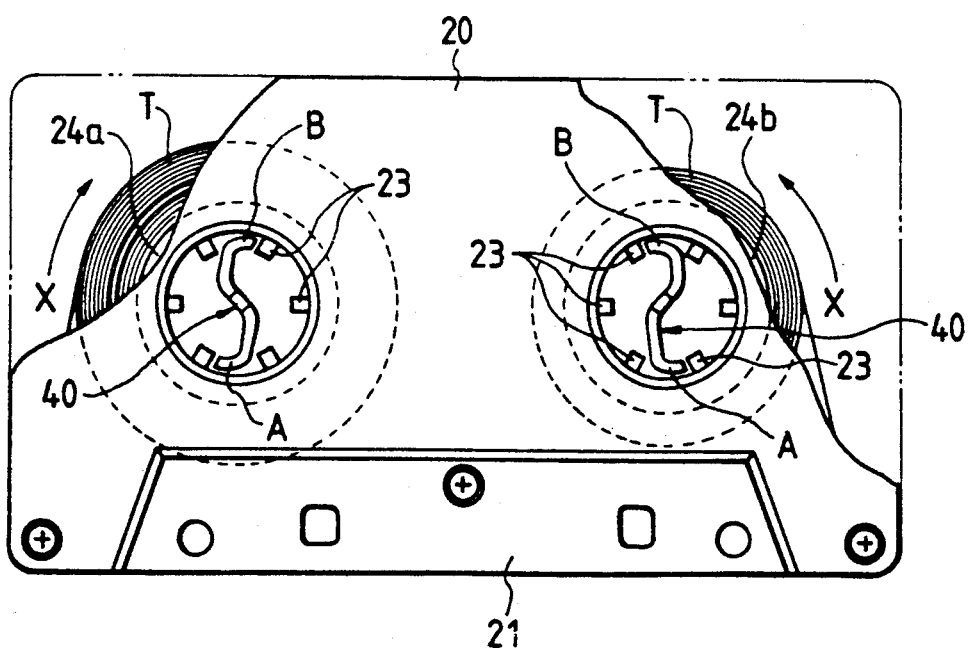
FIG. 2 is a plan view illustrating the status of the engagement between the S-shaped stoppers and the spokes.
Figure 3:
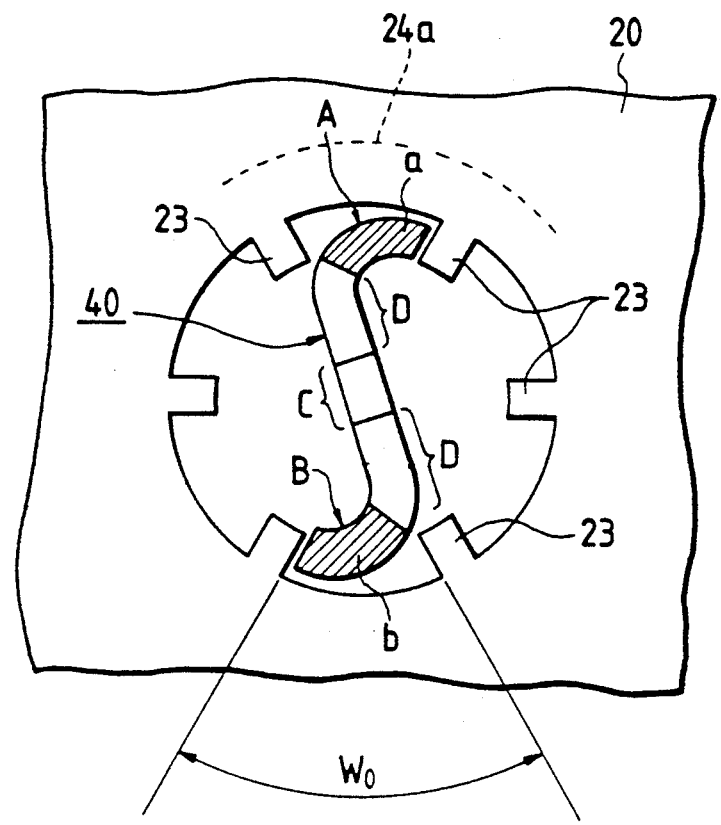
FIG. 3 is an enlarged plan view of details of the S-shaped stopper shown in FIG. 2.
Figure 4:
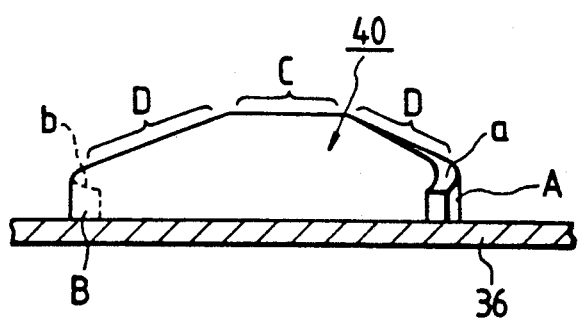
FIG. 4 is a side elevational view of the S-shaped stopper illustrated in FIG. 3.
Figure 10:
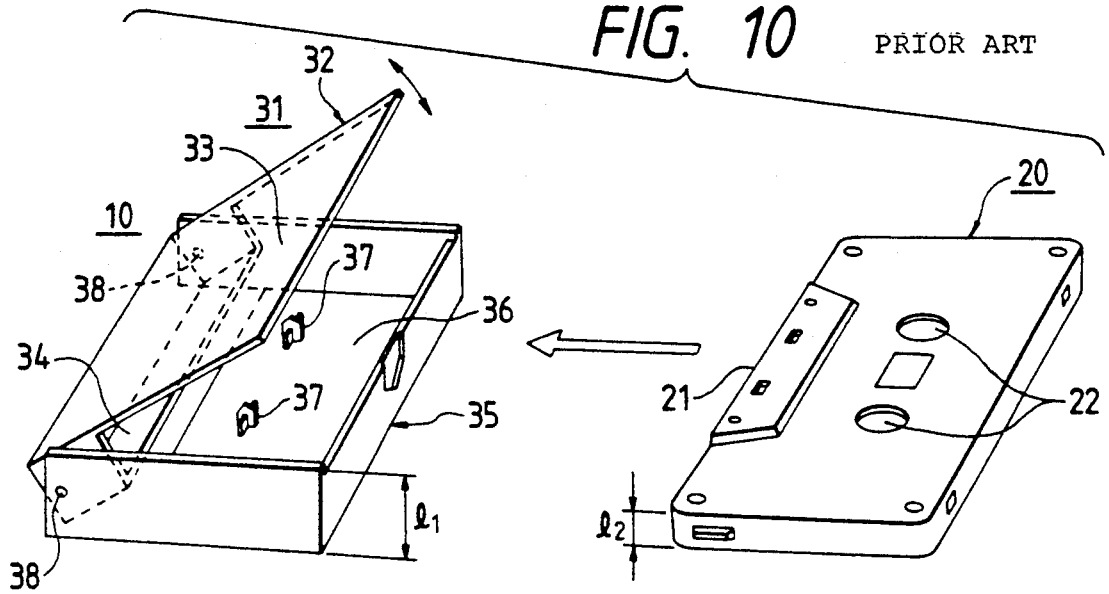
FIG. 10 is a perspective view illustrating an example of a conventional case and tape cassette.

FIG. 1 is a perspective view of essential portions of a case 10 on which a pair of S-shaped stoppers 40 in accordance with an embodiment are formed. FIG. 2 is a plan view illustrating the relationship of retention between the stoppers 40 and a plurality of spokes 23. FIG. 3 is an enlarged plan view of the stopper 40, and FIG. 4 is a side elevational view thereof. It should be noted that the case 10 of this embodiment has the same basic construction as that of the case 31 explained in connection with FIG. 10, with the exception of the structure of the stoppers. Therefore, in describing this embodiment, the aforementioned case 31 shown in FIG. 10 will be referred to as required.

First, a description will be given of the structure of a pair of S-shaped stoppers 40.

The planar configuration of the stoppers 40 is substantially S-shaped, as shown in FIGS. 1 to 3, and its side elevational configuration is formed in an inclined manner such that, as shown in FIG. 4, the height of a central portion C is higher than that of the rest, which are gradually decreasing its height toward curved opposite end portions A and B, respectively. The end portions A, B correspond to the curved portions (or bent portions) referred to in the following description. In addition, upper end surfaces of intermediate portions D between the central portion C and the end portions A, B are inclined, as required, from the central portion C toward the opposite end portions A and B and, in some cases, constitute inclined surfaces continuous with the aforementioned inclined upper end surfaces a, b of the opposite end portions A and B. The purpose of the intermediate portions D is to provide with the guiding inclinations for the spokes 23, while the inclined surfaces referred to in the present invention are the inclined upper end surfaces a, b (indicated by oblique lines in FIG. 3) of the aforementioned end portions A, B.

Accordingly, the whole configuration of the stoppers 40 is formed that of a chevron in which the central portion is the highest as shown in FIG. 4. In addition, the planar full length of each of the inclined upper end surfaces a, b of the stoppers 40 is set are set within the range of length allowing the same to be inserted in a gap between adjacent ones of the spokes 23 projecting inwardly of each of a pair of hubs 24a, 24b, i.e., the gap $W_0$.

Important feature of the structure of the stoppers 40 are that the aforementioned end portions A, B are formed at positions where they can engage the spokes 23, their projecting height is such that the aforementioned inclined upper end surfaces a, b can abut against the spokes 23 midway during the closing of the case cover 33, and a tapered structure is adopted whereby the spokes 23 are ultimately slid down along the inclined upper end surfaces a, b. In addition, the end portions A, B are curved in such a manner that the spokes 23 can be brought into contact with the inclined upper end surfaces a, b while rotating. However, this curved structure is not essential, and a rectilinear structure may be adopted if the structure is able to permit the desired rotation of the hub 24 by maintaining its contact with the spokes 23.

A further description will be given of the direction of curvature of the end portions, A, B and the projecting height of the inclined upper end surfaces a, b. The direction of the inclination of the curved end portions A, B coincides with the direction of winding whereby tightening of the magnetic tape T wound around the hubs 24a, 24b. Thus, the pair of stoppers 40 are a combination of a substantially S-shaped configuration and a substantially reversed S-shaped configuration. In other words, the direction of winding and tightening the tape T is oriented toward the arrow X as shown in FIG. 2, and the projecting height is such as to allow the inclined upper end surfaces a, b to abut against the spokes 23 midway during the closing of the case cover 22, as described above.

Next, a description will be given of the operation of tape winding and tightening when the magnetic tape cassette 20 is accommodated in the case 10.

When accommodating the magnetic tape cassette 20 the case 10 is closed after the thick portion 21 of the cassette 20 is inserted in the pocket 34 of the cover 32. During the closing of the case cover 32, when the spokes 23 are engaged with the inclined upper end surfaces a, b of the end portions A, B, winding and tightening is effected by virtue of the inclination of the inclined upper end surfaces a, b after engagement. This winding and tightening is conducted simultaneously with respect to the inclined upper end surfaces b, and a detailed description will be given of only the inclined upper surface a.

Figure 5:
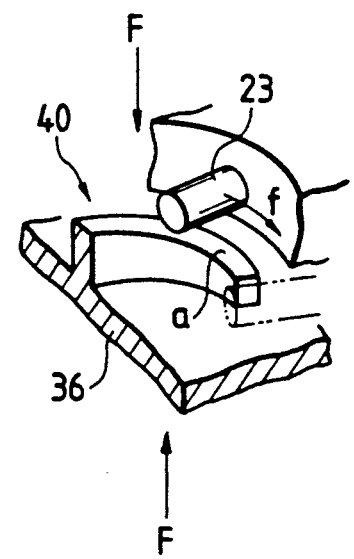
FIG. 5 is a partial perspective view illustrating the sliding motion of the spoke on the S-shaped stopper.

It is assumed that one of the spokes 23 is engaged with the inclined upper end surfaces a of the stopper 40, as shown in FIG. 5. At the time of accommodating the cassette, since the cover 32 and the casing portion 35 are manually closed with respect to each other, even if the spoke 23 is brought into contact with the inclined upper end surface a, the closing operation can be continuously carried out, and a force acting in the direction of thickness of the case 10 (a force F indicated by the arrow F in FIG. 5) is applied to the stopper 40 and the spoke 23. Accordingly, a component force f in the rotating direction of the hub is produced from the abutting force F by means of the inclined upper end surfaces a, b, and the desired rotation of the hub 24 (in the winding a, b, and the desired rotation of the hub (in the winding and tightening direction) is effected by the component force f. Then, the spoke 23 is guided in such a manner as to be slid down along the inclined upper end surface a, and is finally retained (shown by the imaginary line in FIG. 5) in such a manner as to step down from the inclined upper end surface a and b.

In this manner, the hubs 24a, 24b are respectively forcibly rotated, and since the directions of their rotation are oriented in opposite directions, as described above, the hubs 24a, 24b rotate in such a manner as to stretch the magnetic tape T, so that the winding and tightening of the tape T is thereby carried out.

Accordingly, the magnetic tape T is wound and tightened by being stretched in mutually opposite directions by the pair of hubs 24a, 24b. Moreover, since the left and right spokes 23 operating in such a manner as to be slid down along the inclined upper end surface a (b) are both retained at the ends of the stopper 40. Hence, unwinding of the magnetic tape T is prevented, and slack in the magnetic tape T is taken up due to the rotation caused by the inclined upper end surfaces a and b.

For convenience, a description has been given only of the upper end surface with respect to the operation of the stopper 40. However, the engagement with the spokes 23 is carried out in the same manner with respect to the upper end surface b as well.

Figure 6:
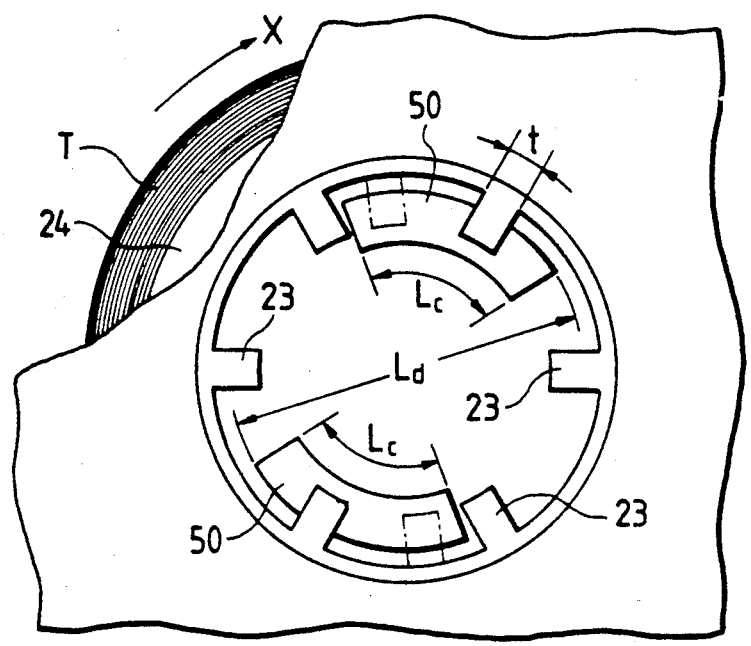
FIG. 6 is an enlarged plan view illustrating the status of the engagement between the modified stoppers and the spokes.
Figure 7:
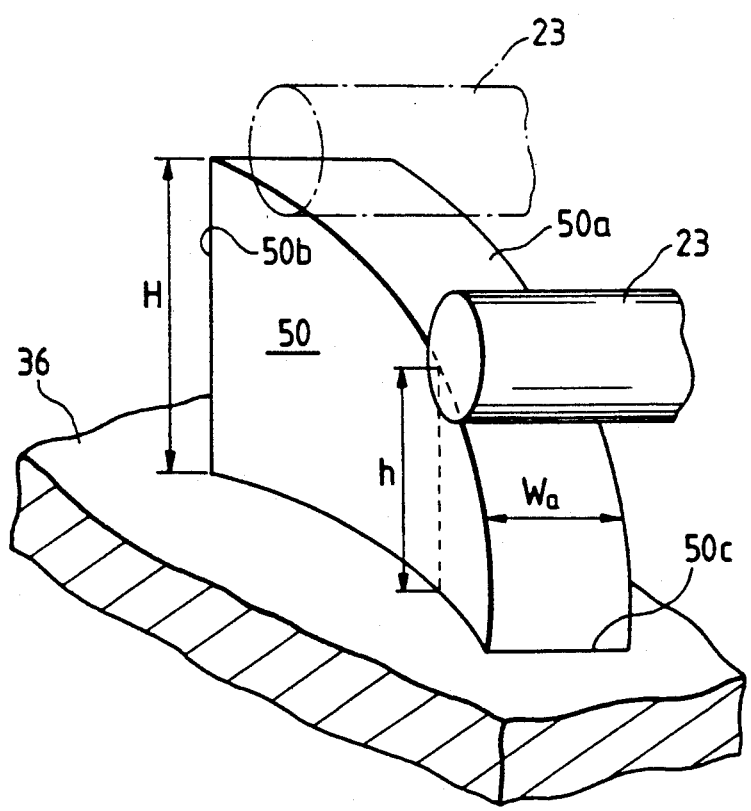
FIG. 7 is a partially enlarged perspective view illustrating the sliding motion of the spoke on the stopper shown in FIG. 6.

Referring now to FIGS. 6 and 7, a description will be given of another modification of the stopper according to the present invention.

It should be noted that the difference between this modification and the above-described embodiment lies in that the aforementioned end portions A and B are separated independently, and that the length of the inclined upper end surface is arranged to be greater than the gap between the adjacent one of the spokes. The structure of this modification is optimally suited to the cases in which the shaking movement of the cassette in the thickness direction of the case is very small, as in the case of the so-called "slim plastic case". With respect to portions other than the stopper, a description will be given using the same reference numbers as in the foregoing embodiment.

A plurality of circular stoppers 50 shown in FIGS. 6 and 7 are actually provided at two locations inside the case in correspondence with the aforementioned pair of hubs 24a and 24b. In this embodiment, however, a description will be given of the stoppers 50 at only one location for winding and tightening the hub 24a.

As shown in FIG. 6, the stoppers 50 are formed at a predetermined interval therebetween, e.g., at positions where the spokes 23 are engaged thereby when the cassette 20 is accommodated in the case 10. An inclined upper end surface 50a of the stoppers 50 is formed in an inclined manner, as shown in FIG. 7, such that an end 50b where its projecting height is larger than that of the rest (height H) is vertically stood up from the inner bottom surface 36 of the casing portion 35, while the other end 50c is connected to the inner bottom surface 36 in an inclined manner.

In addition, the full length of the stopper 50, i.e., the length $L_c$ from the end 50b to the other end 50c, is longer than the gap $W_0$ between adjacent ones of the spokes 23. Accordingly, when accommodating the cassette 20, as the spokes 23 are brought into contact with the inclined upper end surface 50a, for instance, in the vicinity of the position of the height h shown by the dotted line in the drawing, rotation of the hub 24 (rotation in the direction of slackening) is thereby prevented. The width $W_a$ of the stopper 50 is not particularly restricted its value and may be set as required, while the outer diameter $L_d$ of the stopper 50 is smaller than the inner diameter $L_e$ of the hub hole of the hub 24a. It should be noted that although in the illustration the stoppers 50 are formed in an upright manner with respect to the inner bottom surface 36, it is possible to adopt, as required, an arrangement in which the stoppers 50 are inclined such that the width $W_a$ of the stoppers 50 is increased with its projecting height being gradually decreasing toward the outside. If the arrangement is provided with such a guiding inclination, the entrance of the stopper 50 into the hub hole is facilitated, and the accommodation of the cassette 20 can be made smoothly.

In this embodiment, in the state in which the magnetic tape cassette 20 is accommodated completely, the hub is not retained in such a manner that the spokes 23 are not caught with the stoppers 50 at all merely riding on the inclined upper end surface 50a. However, if the inclination of the inclined upper end surface 50a is set larger, and the inclined upper end surface 50a is provided with the height enough to contact with the spokes 23 when the case 10 is closed, retention of the hub is effected by virtue of the frictional force which maintains the closed state of the case 10 (the retention force obtained from the fitting of the casing portion and the cover at their projections and recesses). With such an arrangement, particularly when applied to the slim Plastic Case, the amount of shaking movement of the magnetic tape cassette 20 in its thickness direction is kept small, and it is possible to perform effective hub retention.

In each of the embodiment and modification described above, at the time of accommodating the magnetic tape cassette 20, there may be instances where the spoke 23 fails to be retained by the stopper 40 or 50, and the winding and tightening of the tape T is not carried out; however, the tape winding and tightening motion of the hubs 24a and 24b can be produced at a high probability. In addition, even when the winding and tightening motion is not produced, shaking movement of the spoke 23 is prevented by the stopper 40 or 50, so that tape slackening is not promoted.

Figure 8:
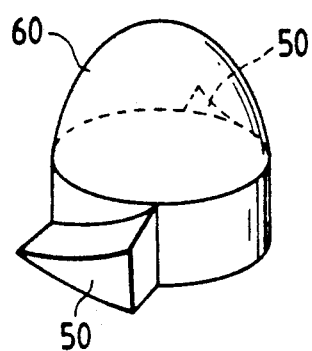
FIG. 8 is a partially enlarged perspective view of further modification of the stopper.

In the embodiments described above, substantially S-shaped or two separate stopper 40 or 50 have been shown, but the present invention is not restricted to those embodiments, and may be modified as shown in FIG. 8.

In the further modification shown in FIG. 8, a guide member is added which guides the stopper 50 shown in the above-described modification into the hub hole. Namely, in cases where the stopper 50 is provided uprightly substantially orthogonal to the inner bottom surface 36, the stopper 50 will not necessarily enter the hub hole smoothly. Therefore, by providing a guide member 60, which may be referred to as a tapered bullet type, between the stoppers 50, the stoppers 50 can be guided smoothly and accurately into the hub hole.

Although preferred embodiments of the present invention have been described above, various other modifications are possible.

Figure 9:
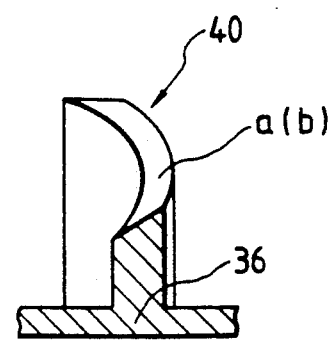
FIG. 9 is a cross-sectional view of an essential portion illustrating still another modification of the stopper.
Figure 11:
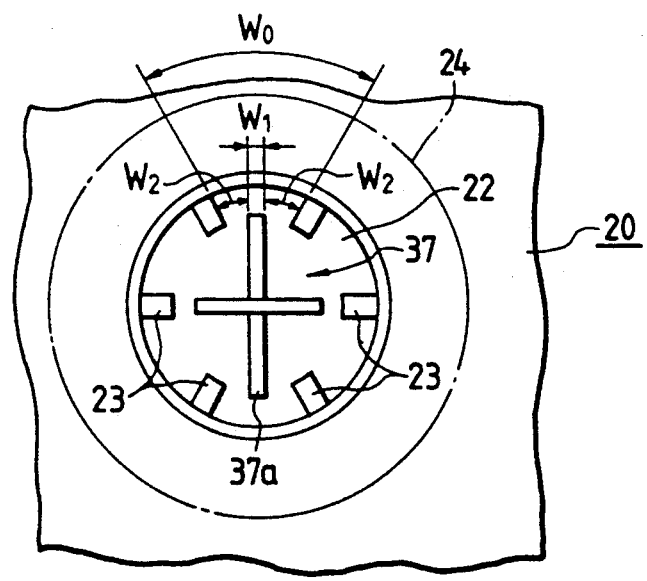
FIG. 11 is a plan view illustrating the status of the engagement between the simple cross-shaped stopper and the spokes.
Figure 12:
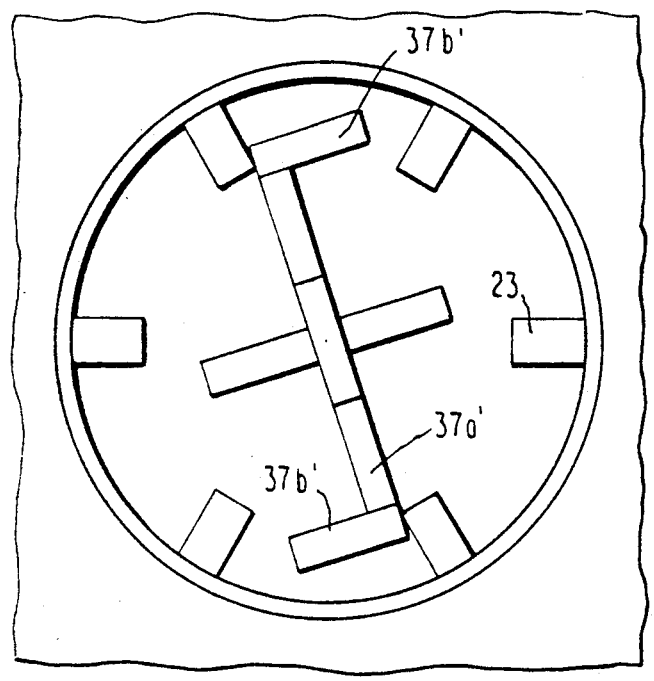
FIG. 12 is a plan view illustrating the status of the engagement between a crank-shaped stopper and the spokes.
Figure 13:
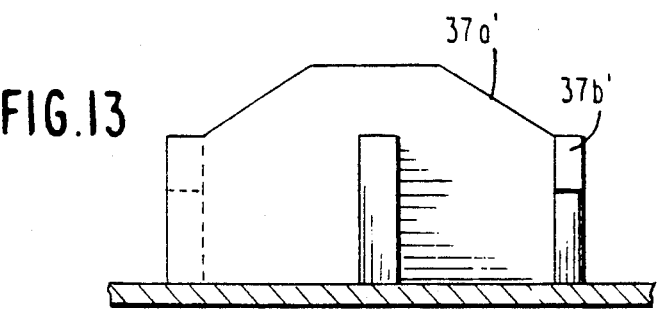
FIG. 13 is a side view of the crank-shaped stopper of FIG. 11.
Figure 14:
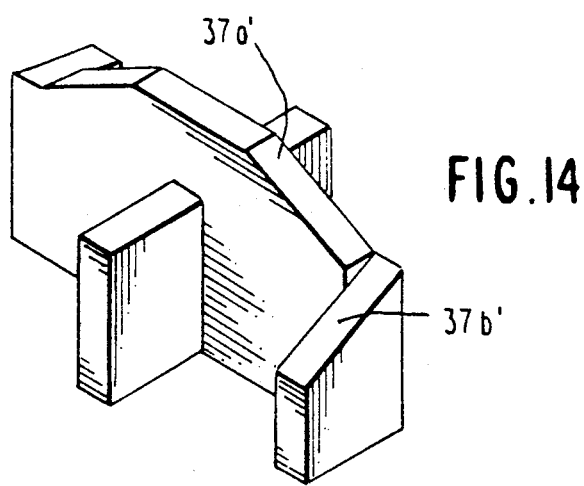
FIG. 14 is a perspective view of the crank-shaped stopper of FIG. 11.

In the above-described preferred embodiment, the configuration of the stoppers 40 in terms of its planar configuration is arranged to be S-shaped or inversely S-shaped, but the present invention is not restricted to the same. For instance, it is possible to adopt an arrangement which is based on a substantially cross-shaped type, as shown in FIG. 11, and a crank-shaped structure in which a bent portion having an inclined upper end surface 37b' is formed at the end of the elongated member 37a', as depicted in FIGS. 12-14. In addition, a symmetrical configuration such as the S-shape need not always be used, and an arrangement may be adapted in which either one of the upper end surfaces a or b is used, and the other end portion is omitted. Furthermore, as for the inclined upper end surfaces a and b, in addition to providing the longitudinal inclination for the curved portion, as described above, the cross-section of that portion may be formed into a configuration of a blade, as shown in FIG. 9.

In addition, although in the above-described embodiment and modifications a pair of stoppers 40 or 50 is employed, if only one side is provided with a stopper of a conventional structure and the other side is arranged with the stopper of the present invention, it is possible to obtain a winding and tightening effect similar to that described above.

It goes without saying that the present invention is applicable to the Slim Plastic Case such as those disclosed in, for instance, Japanese Laid-Open Utility-Model Applications Nos. 163279/1975 and 52782/1985.

As described above, the case in accordance with the present invention is arranged such that a cover having a pocket and a casing portion having stoppers are pivotally secured to each other openably and closably in the manner of a door, the stopper being formed such that a portion coming into contact with a spoke has a bent or curved portion extending substantially along the direction of winding and tightening the hub, this curved (bent) portion being provided with an inclined upper end surface gradually decreasing the projecting height toward its projecting end. Accordingly, at the time when the cover is closed with respect to the casing portion after the magnetic tape cassette is placed in the pocket, the spoke is engaged with the inclined upper end surface of the stopper, so that the spoke is guided along the inclined upper end surface in the direction of winding and tightening the magnetic tape, thereby allowing the hub to rotate and effecting the winding and tightening of the tape. In addition, after the tape is wound and tightened, the spoke is finally retained at the terminating end or in the vicinity of the terminating end of the aforementioned curved (bent) portion. Hence, shaking movement of the hub in the loosening direction is prevented, thereby preventing tape slackening when the cassette is being accommodated in the case.

Although the embodiment and modifications described above concern a pair of stoppers 40 which is a substantially reversed S-shaped configuration with respect to each other. However, the present invention is not limited thereto or thereby. That is, a pair of stoppers appearing the same S-shaped configuration may be provided in case that a hub with substantially no tape is mounted on a direction of winding and tightening the tape side of the cassette and a hub with full tapes is mounted on the other side of the cassette since, in this case, no excessive tape loosening would occur in the vicinity of the opening of the cassette.

What is claimed is:

1. In a case in which a cover having a pocket for accommodating one end of a magnetic tape cassette and a casing portion having a pair of stoppers for preventing the rotation of a pair of hubs by engaging spokes of the pair of hubs are pivotally secured to each other in the manner of a door, the improvement wherein each of said stoppers has at least a portion thereof located between adjacent ones of said spokes and has at least one bent or curved portion extending substantially along an inner peripheral edge of said hub in proximity to said inner peripheral edge, and said bent or curved portion is provided with an inclined upper end surface for rotating and urging said hub in a predetermined direction contained in said cassette by contacting said spokes when said casing portion and said cover are closed with respect to each other.

2. The case according to claim 1, wherein one of said pair of stoppers has substantially an S-shaped configuration and the other of said pair of stoppers has substantially an inverted S-shaped configuration.

3. The case according to claim 2, wherein central portions of each of said stoppers are higher than that of the rest.

4. The case according to claim 3, wherein said central portion is generally straight and said end portions are curved.

5. The case according to claim 1, wherein said pair of stoppers each comprise a plurality of curved portions formed separately from one another.

6. The case according to claim 5, wherein said curved portions are arcuately shaped.

7. The case according to claim 5, wherein a length of each of said curved portions is greater than a length of a gap between adjacent spokes of hubs of a cassette to be accommodated in said case.

8. The case according to claim 6, wherein ends of adjacent ones of said stoppers approach one another.

9. The case according to claim 5, wherein said stoppers are inclined such that a width thereof is increased toward the outside.

10. The case according to claim 5, further comprising a guide member for at least some of said stoppers for guiding said stoppers into half holes of a cassette accommodated in said case.

11. The case according to claim 10, wherein said stoppers have a tapered bullet shape.

12. The case according to claim 1, wherein said stoppers have substantially a cross shape.

13. The case according to claim 1, wherein said stoppers have substantially a crank shape comprising an elongated portion and a bent portion having an inclined upper end surface formed at an end of said elongated portion.

14. The case according to claim 1, wherein upper edges of each said stoppers have a blade shape.

15. The case according to claim 1, wherein both of said pair of stoppers have substantially the same S-shaped configuration.

* * * * *